Sept. 14, 1937.　　　D. E. THALMAN　　　2,092,992
EMULSIFYING APPARATUS
Filed Aug. 19, 1935
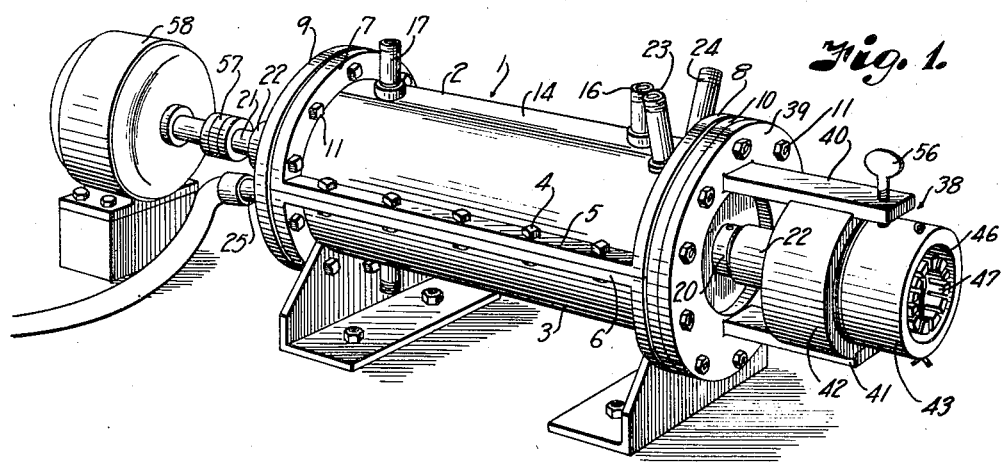
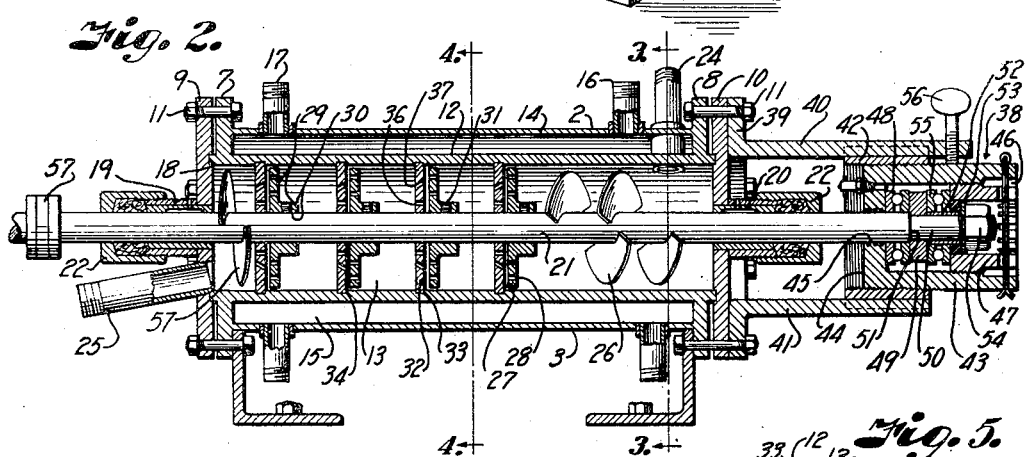
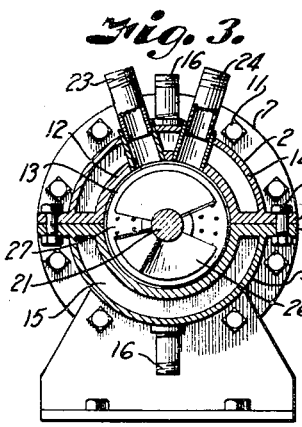
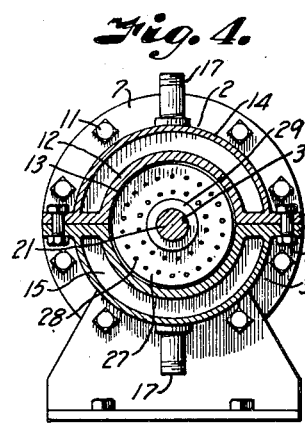
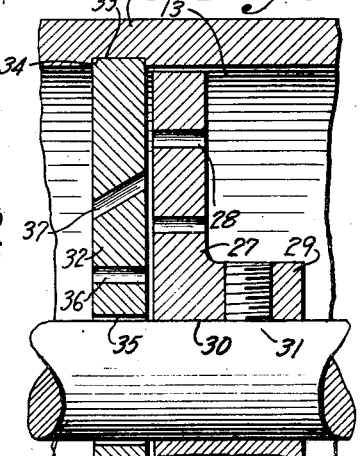
INVENTOR
Daniel E. Thalman
BY
ATTORNEY Patented Sept. 14, 1937

2,092,992

UNITED STATES PATENT OFFICE 2,092,992

EMULSIFYING APPARATUS

Daniel E. Thalman, Tulsa, Okla.

Application August 19, 1935, Serial No. 36,831

2 Claims. (Cl. 259—9)

My invention relates to a mixing apparatus and more particularly to a machine for preparing emulsions of difficultly miscible materials and has for its principal object to provide an apparatus of this character which will efficiently and economically produce homogenization of globules of immiscible liquids.

Other important objects of the invention are to obtain intimacy of contact of the materials through a hydraulic grinding and centrifugal action, thereby producing a more standard product, to provide for rapid minute disintegration of solids suspended in the liquids and their complete uniform dispersion throughout the emulsion, to provide an extremely quick and accurate adjustment of the apparatus for absolute control of the fineness and uniformity of mixtures, and to provide for heating or cooling of the materials during emulsification depending upon the nature of the materials and the product being prepared.

In accomplishing these and other objects of the invention, I have provided improved details of structure, the preferred form of which is illustrated in the accompanying drawing, wherein:

Fig. 1 is a perspective view of an emulsifying and dispersing machine constructed in accordance with my invention.

Fig. 2 is a longitudinal section through the machine.

Fig. 3 is a cross section through the machine, on the line 3—3, Fig. 2, illustrating the mixing blades by which an initial mix is effected.

Fig. 4 is a cross section on the line 4—4, Fig. 2, illustrating the rotating disks, and Fig. 5 is an enlarged fragmentary section through a rotary and stationary disk showing the arrangement of apertures therein.

Referring more in detail to the drawing:

1 designates a cylindrical mixing chamber comprising upper and lower half sections 2 and 3 secured together by fastening devices 4 extending through mating horizontal flanges 5 and 6 formed on the longitudinal edges of the respective sections, as clearly shown in Figs. 1, 3 and 4. The sections 2 and 3 are also provided with end flanges 7 and 8 to which cylinder heads 9 and 10 are secured by fastening devices 11. The sections 2 and 3 are provided with inner semicircular walls 12 which cooperate with the cylinder heads 9 and 10 to provide a cylindrical mixing chamber 13 when the sections are assembled. Spaced from the inner walls 12 of the cylinder are outer walls 14 to form semicircular passageways 15 about the mixing chamber for the circulation of a heating or cooling medium, as the case may require, the tempering medium being circulated through inlet and outlet connections 16 and 17 in the respective sections.

In order to effect positive seal between the cylinder heads and the ends of the sections, the inner walls 12 extend slightly beyond the end faces of the flanges and into annular grooves 18 formed on the inner faces of the heads, as shown in Fig. 2.

The cylinder heads carry outwardly extending bearings 19 and 20 for rotatably mounting a rotor shaft 21 extending axially of the mixing chamber. The ends of the bearings are sealed about the shaft by suitable packing boxes 22 to prevent the materials in the mixing chamber from escaping therethrough.

The upper section 2 is provided adjacent the end thereof with inlet connections 23 and 24 for the admission of the materials which are to be emulsified in the mixing chamber and the opposite end of the chamber is provided with an outlet connection 25 for the discharge of the emulsified materials, the outlet connection shown being mounted in the cylinder head 9.

In order to initially mix the materials admitted through the connections 23 and 24, the shaft at that end of the chamber is provided with a series of helically disposed mixing blades or paddles 26 arranged in pairs on opposite sides of the shaft. The helical arrangement of the blades also effects gyration of the materials toward the first of the dispersing and grinding disks, now to be described.

I have found that by spraying the material under pressure, afforded by the centrifugal force of a gyrating body of fluid, against an obstructing surface and within narrow confines, the globules of immiscible fluids are readily broken up and united to form a homogeneous emulsion.

In carrying out this operation the shaft carries a series of disks 27 located thereon at spaced points between the blades 26 and the outlet 25. Each disk includes a circular plate-like body of a diameter to rotate freely within the mixing chamber and having a circular series of apertures 28 preferably extending therethrough on an axis parallel with the shaft. The disks include hub portions 29 having bores 30 to snugly receive the shaft, the disks being fixed thereto by screws 31 threaded in the hub and engaging the shaft, as shown in Fig. 2.

When the machine is in operation, the pressure produced by centrifugal force of the gyrating fluid causes the fluid to be sprayed through the apertures and against stationary disks 32.

There is a stationary disk 32 arranged on the discharge side of each rotary disk so that the sprays discharged through the apertures 28 are impacted thereagainst and caused to be ground between the disks. The stationary disks include circular plates having their peripheries 33 mounted in grooves 34 formed in the wall of the cylinder and their centers are provided with openings 35 to pass the shaft.

In order that the material may advance past the stationary disks, they are provided with a series of apertures 36 spaced in the direction of the shaft from the inner circular series of apertures 29 in the rotating disks and an outer series of apertures 37 located therein at points between circular series of apertures in the rotating disks, as shown in Fig. 5.

In order that the material may be delivered to the center of the chamber after passing through these apertures, they are preferably inclined toward the axis of the shaft, as shown.

The material upon entering the spaces between the disks is ground and reduced therein to a fineness and the globules united as governed by the width of the spacing and to readily control the effective spacing of the disks, as well as to retain that spacing when the disks are once adjusted, I provide a special adjustable thrust bearing 38 for the rotor shaft, whereby a suitable width spacing may be maintained to give a standard product, as now to be described.

Fixed by the fastening devices 11 which attach the cylinder head 10 is a flat ring 39 having spaced arms 40 and 41 extending therefrom in parallel relation to the shaft to mount a fixed internally threaded ring 42. Threaded in the ring 42 is a bearing sleeve 43 having a closed end 44 provided with an opening 45 therein to receive the shaft and an open outer end 46 to receive a threaded ring-shaped stop nut 47.

Mounted on the shaft within the sleeve is an anti-friction thrust bearing 48 having one side engaging the end 44 of the sleeve and its opposite side engaged by a washer 49. The washer 49 is sleeved on a reduced end 50 of the shaft and is retained against a shoulder 51 thereon aligning with the outer face of the bearing 48, the washer being retained against the shoulder by a bushing 52 sleeved on the reduced portion of the shaft and having its opposite end engaged by a washer 53 clamped thereagainst by a nut 54.

It is thus apparent that the shaft cannot move longitudinally in the direction of the mixing chamber because of the washer 49, bushing 52 and nut 54.

In order to prevent movement of the shaft in the opposite direction, the bushing 52 carries a similar anti-friction thrust bearing 55 having one side engaging the washer 49 and the other the stop nut 47. The stop nut 47 is retained from rotation by a cotter pin extending through the outer end of the sleeve and through a castellated portion of the ring nut, as shown, while the sleeve 43 is retained from rotation by a set screw 56 threaded through an extended end of the upper arm 40.

It is obvious that when the sleeve is threaded in the ring, the shaft is anchored from movement in either direction until the sleeve is rotated.

In order to drive the rotor shaft, its opposite end is connected by a sliding flexible coupling 57 with the armature shaft of a motor 58 or to the drive of any other type of suitable prime mover.

It may also be desirable to equip the shaft 21 with an impeller 57 at the discharge end of the mixing chamber 13 to effect forced flow of the finished product through the outlet 25 and so that it may be elevated into a tank located at a higher level than the emulsifying apparatus.

In using the apparatus constructed and assembled as described, and assuming that a petroleum asphalt and water emulsion is to be prepared, the set screw 56 is loosened and the sleeve 43 rotated to give the proper clearance between the rotary and stationary plates to produce the standard emulsion desired. The set screw is then retightened. Steam, or the like, is admitted to the spaces for heating the materials being emulsified to make them as miscible as possible. The motor is then energized to rotate the shaft and rotary disks including the paddles. The fluids are then introduced to the heated mixing chamber through their respective inlet pipes 23 and 24 and initially mixed by the paddles.

The helical arrangement of the paddles forces the mixed fluids toward the emulsifying plates where it is directed through the apertures in the first rotary disk and against the complementary fixed disk where the fluids are rubbed and ground into intimate contact until they finally escape through the apertures in the fixed disk from where the fluid passes to and through the succeeding stages of emulsifying disks to discharge as a homogeneous emulsion through the outlet connection 25.

It is apparent that I have provided a simply constructed device that will effectively form emulsions of difficultly miscible materials by hydraulic forces produced within the confines of the disks.

What I claim and desire to secure by Letters Patent is:

1. An apparatus of the character described, including a cylindrical mixing chamber, means for admitting materials to be emulsified at one end of the chamber, a shaft, means mounting the shaft in the axis of the mixing chamber, means on the shaft adjacent the point of admission of the materials for initially mixing the materials and for effecting gyratory movement of the materials about the axis of the shaft and toward the opposite end of said chamber, a disk fixed to the shaft for interrupting gyratory movement of the materials toward said opposite end of the chamber and having a circular series of apertures therein for flow of materials therethrough, a disk fixed in the mixing chamber and having a circular series of apertures offset from those in the first named disk to cooperate with the first named disk for emulsifying said materials, means mounting the shaft for longitudinal movement relatively to the mixing chamber to vary spacing between said disks, and means for rotating the shaft.

2. An apparatus of the character described including a mixing chamber, means for admitting materials to be emulsified into the mixing chamber, a shaft, means rotatably mounting the shaft in the mixing chamber, a disk fixed to the shaft having apertures for flow of materials therethrough, a disk fixed in the mixing chamber and having apertures offset from those in the first named disk to cooperate with the first named disk in emulsifying said materials, a thrust bearing carried by the shaft, a carrier for the thrust bearing, means threadingly supporting the carrier for moving the shaft longitudinally within the mixing chamber to vary the spacing between said disks, and means for rotating the shaft.

DANIEL E. THALMAN.